Patented Oct. 1, 1940

2,216,238

UNITED STATES PATENT OFFICE 2,216,238

RECOVERY OF FATTY ACIDS

Max Harder, Ludwigshafen-on-the-Rhine, Germany, assignor, by mesne assignments, to Jasco, Incorporated, a corporation of Louisiana No Drawing. Application December 7, 1938, Serial No. 244,393. In Germany December 11, 1937

10 Claims. (Cl. 260—452)

The present invention relates to an improved process for recovering fatty acids from oxidation products of high-molecular non-aromatic hydrocarbons.

In processes for the separation and purification of fatty acids contained in oxidation products of high-molecular non-aromatic hydrocarbons there are frequently obtained high-boiling distillation or extraction residues which cannot be used as such. The said residues thus cause a considerable lowering of the yield in the desirable fatty acids suitable for preparing soaps.

I have now found that distillation and extraction residues of the said kind which are not volatile under a pressure of 10 to 15 millimeters mercury gauge at temperatures of below 260° C. (measured in the liquid content of the distillation vessel), may be converted, wholly or partly, into fatty acids which are volatile under the said conditions, by saponifying the residues or fractions separated thereof, heating the saponification products obtained at a temperature above 220° C., removing the unsaponifiable constituents and then separating the fatty acids from the resulting soaps by adding mineral acids.

Distillation residues suitable as initial substances for the process according to the present invention are for example such as are obtained in the usual distillation of oxidation products from hard or soft paraffins, paraffin oils, middle oils, Diesel oil or hydrogenation products of coals, tars or the oxides of carbon. Residues obtained in the distillation of crude fatty acids resulting in the saponification and separation of unsaponifiable constituents from the said oxidation products are particularly suitable.

Furthermore, constituents separated off from the distillation residues, for example by extraction, sweating or distillation, as for example fractions resulting in the distillation at temperatures above 260° C. (measured in the liquid residue) are suitable as initial substances. Also high-boiling extraction residues, consisting for the greater part of hydroxy acids, which are for example obtained in the extraction of oxidation products of non-aromatic hydrocarbons of high-molecular weight or of the crude fatty acids obtained from the same by means of solvents insoluble in water, such as benzine, may be used as initial materials.

The process is carried out, for example, in such a manner that the said residues are first saponified with alkaline reacting agents, for example caustic soda or potash solution, sodium carbonate or ammonia, in an amount sufficient for the complete saponification, or also with a smaller or larger amount, whereby it is preferable to work in the presence of water. The saponification mixture is then heated to temperatures above 220° C., preferably to temperatures above 300° C., for example to from 300 to 350° C. The duration of the heating depends on the nature and on the amount of the saponification product, of the desired end product and on the working conditions, for example on the temperature; it may last a few minutes or several hours, as a rule half an hour to two hours are sufficient.

The heating of the saponified residues may also be carried out in the presence of substances promoting the splitting off of water, such as the oxides of aluminum, tungsten, titanium, zirconium, chromium, molybdenum, uranium, or boron, or mixtures of these oxides, and furthermore salts, such as phosphates. Also surface-active substances may be employed, as for example kieselguhr, active coal or bleaching earth, on the surfaces of which there may be applied special substances capable of favoring the splitting off of water. The heating may also be carried out in the presence of metals evolving hydrogen in an alkaline medium, such as zinc, aluminum or magnesium. Sulphonic acids, for example beta-naphthalene sulphonic acid, may also be present.

The heating may be effected under increased or reduced pressure, and hydrogen, steam or water may also be present during the heating.

After the heating, any unsaponifiable constituents are separated from the soap, preferably by distillation or by extraction by means of solvents; they may then be subjected again to oxidation.

As an effect of the high temperatures, the fatty acid compounds present in the said residues are most probably depolymerized and thereby converted into lower boiling constituents. There are thus obtained from the high boiling distillation and extraction residues of the paraffin oxidation high amounts of soap-forming fatty acids, so that the residues, which hitherto could not be used up, are transformed wholly or in part into valuable fatty acids.

The following examples are given to illustrate the invention more clearly but the invention is not restricted to these examples. The parts are by weight.

*Example 1*

1,000 parts of a crude fatty acid, obtained from 3,000 parts of an oxidation product of paraffin wax, are subjected to fractional distillation under a pressure of 10 millimeters mercury gauge and while leading in wet steam according to the process of the U. S. Patent No. 1,622,126, those constituents distilling off up to 260° C. (measured in the distillation residues) being collected as the first fraction, and those distilling off at from 260° to 290° C. being collected, separately from the first fraction, as the second fraction. 200 parts of the second fraction are stirred at 100° C. with 76 parts by weight of a 35 per cent caustic soda solution, 400 parts by weight of water are added and the whole heated in an autoclave to 330° C. under a pressure of 130 atmospheres. After remaining for 1½ hours the product is released to atmospheric pressure in a tubular heating system, such as is described in my copending U. S. application Ser. No. 167,930, whereby the soap is sprayed in the tube system and at the same time heated to 380° C. There distil over, together with the steam, 28 parts of unsaponifiable constituents, 195 parts by weight of soap flowing off as a melt.

The soap is dissolved in an equal amount of water and the solution acidified by means of dilute sulphuric acid. The fatty acid thus separating off is then distilled again in vacuo while leading in wet steam, whereby it distills over at 260° C. under a pressure of 10 millimeters in a yield of 85 per cent. In the following table are contrasted the characteristics of the initial product with those of the product obtained according to the treatment described.

|  | Acid number | Saponification number | Ester number | Hydroxyl number | Carbonyl number | Unsaponifiable constituents |
|---|---|---|---|---|---|---|
| (a) Initial substance (fatty acid fraction distilling between 260° and 290° C.) | 174 | 199 | 25 | 10 | 35 | 2.8 |
| (b) Fatty acid obtained from the said initial substance after heating the saponifiable constituents, acidifying and distilling | 206 | 206 | 0 | 0 | 20 | 1.0 |

Example 2

500 parts of a residue, which had been obtained in the distillation of a crude fatty acid obtained from an oxidation product of soft paraffin, under a pressure of 10 millimeters mercury gauge at a temperature of 270° C., are saponified with 300 parts of a 20 per cent caustic soda solution at 110° C. The soap solution is subjected, at 350° C. and under a pressure of 150 atmospheres, to the treatment described in Example 1, whereupon it is freed from unsaponifiable constituents. There are thus obtained 60 parts of unsaponifiable constituents, which may be subjected anew to oxidation. The soap solution is acidified with dilute sulphuric acid, 390 parts of fatty acid thus separating, which are subjected to distillation in vacuo. The 250 parts of fatty acids thus obtained have a pale color, their properties being considerably improved, as results from the comparison of their characteristics:

|  | Acid number | Saponification number | Ester number | Unsaponifiable constituents |
|---|---|---|---|---|
| (a) Initial substance (fatty acid residue distilling up to 270° C.) | 87 | 163 | 76 | 9 |
| (b) Fatty acid obtained from the said initial substance after heating the saponifiable constituents, acidifying and distillation | 230 | 240 | 10 | 1.4 |

What I claim is:

1. The process of recovering high-molecular fatty acids from oxidation products of high-molecular non-aromatic hydrocarbons, which comprises saponifying a residue which is not volatile under a pressure of 10 millimeters mercury gauge at a temperature of below 260° C., obtained when working up the said oxidation products, heating the saponification product at a temperature above 220° C., removing the unsaponifiable constituents and separating the fatty acids from the resulting soaps by adding a mineral acid.

2. The process of recovering high-molecular fatty acids from oxidation products of high-molecular paraffin hydrocarbons which comprises saponifying a residue which is not volatile under a pressure of 10 millimeters mercury gauge at a temperature of below 260° C., obtained when working up the said oxidation products, heating the saponification product at a temperature above 220° C., removing the unsaponifiable constituents and separating the fatty acids from the resulting soaps by adding a mineral acid.

3. The process of recovering high-molecular fatty acids from oxidation products of high-molecular non-aromatic hydrocarbons, which comprises saponifying a residue which is not volatile under a pressure of 10 millimeters mercury gauge at a temperature of below 260° C., obtained when working up the said oxidation products, heating the saponification product at a temperature above 220° C. in the presence of water, removing the unsaponifiable constituents and separating the fatty acids from the resulting soaps by adding a mineral acid.

4. The process of recovering high-molecular fatty acids from oxidation products of high-molecular non-aromatic hydrocarbons, which comprises saponifying the residue which is not volatile under a pressure of 10 millimeters mercury gauge at a temperature of below 260° C., obtained when working up the said oxidation products, heating the saponification product at a temperature above 220° C. in the presence of water and a substance favoring the splitting off of water, removing the unsaponifiable constituents and separating the fatty acids from the resulting soap by adding a mineral acid.

5. The process of recovering high-molecular fatty acids from oxidation products of high-molecular non-aromatic hydrocarbons, which comprises saponifying the residue which is not volatile under a pressure of 10 millimeters mercury gauge at a temperature of below 260° C., obtained when working up the said oxidation products, heating the saponification product at a temperature above 220° C. in the presence of a substance favoring the splitting off of water, removing the unsaponifiable constituents and separating the fatty acids from the resulting soap by adding a mineral acid.

6. An improved process for the production of high molecular fatty acids from oxidation products of high-molecular non-aromatic hydrocarbons which comprises recovering the crude fatty acids from the oxidation products, separating the constituents of the crude fatty acids boiling at a temperature of below 260° C. under a pressure of 10 mm. mercury gauge from the constituents which are not volatile at said temperature under said pressure, saponifying at least part of said high boiling constituents, heating the saponification product at a temperature above 220° C., removing unsaponifiable constituents therefrom, and separating the fatty acids from the resulting soaps by adding a mineral acid.

7. An improved process for the production of high molecular fatty acids from oxidation products of high molecular paraffin hydrocarbons which comprises recovering the crude fatty acids from the oxidation products, separating the constituents of the crude fatty acids boiling at a temperature of below 260° C. under a pressure of 10 mm. mercury gauge from the constituents which are not volatile at said temperature under said pressure, saponifying at least part of said high boiling constituents, heating the saponification product at a temperature above 220° C., removing unsaponifiable constituents therefrom, and separating the fatty acids from the resulting soaps by adding a mineral acid.

8. An improved process for the production of high-molecular fatty acids from oxidation products of high-molecular non-aromatic hydrocarbons which comprises recovering the crude fatty acids from the oxidation products, separating the constituents of the crude fatty acids boiling at a temperature of below 260° C. under a pressure of 10 mm. mercury gauge from the constituents which are not volatile at said temperature under said pressure, saponifying at least part of said high boiling constituents, heating the saponification product at a temperature above 220° C. in the presence of water, removing unsaponifiable constituents therefrom, and separating the fatty acids from the resulting soaps by adding a mineral acid.

9. An improved process for the production of high molecular fatty acids from oxidation products of high-molecular non-aromatic hydrocarbons which comprises recovering the crude fatty acids from the oxidation products, separating the constituents of the crude fatty acids boiling at a temperature of below 260° C. under a pressure of 10 mm. mercury gauge from the constituents which are not volatile at said temperature under said pressure, saponifying at least part of said high boiling constituents, heating the saponification product at a temperature above 220° C., in the presence of water and of a substance favoring the splitting off of water, removing the unsaponifiable constituents, and separating the fatty acids from the resulting soaps by adding a mineral acid.

10. An improved process for the production of high-molecular fatty acids from oxidation products of high-molecular non-aromatic hydrocarbons which comprises recovering the crude fatty acids from the oxidation products, separating the constituents of the crude fatty acids boiling at a temperature of below 260° C. under a pressure of 10 mm. mercury gauge from the constituents which are not volatile at said temperature under said pressure, saponifying at least part of said high boiling constituents, heating the saponification product at a temperature above 220° C., in the presence of a substance favoring the splitting off of water, removing the unsaponifiable constituents and separating the fatty acids from the resulting soaps by adding a mineral acid.

MAX HARDER.